United States Patent
Xia et al.

(10) Patent No.: US 11,218,914 B2
(45) Date of Patent: Jan. 4, 2022

(54) INTEGRATION METHOD, DEVICE AND SYSTEM FOR MULTIPLE CENTRALIZED UNITS

(71) Applicant: ZTE CORPORATION, Guangdong (CN)

(72) Inventors: Peng Xia, Guangdong (CN); Zheng Peng, Guangdong (CN); Qiang Zhou, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/754,808

(22) PCT Filed: Oct. 16, 2018

(86) PCT No.: PCT/CN2018/110428
§ 371 (c)(1),
(2) Date: Apr. 9, 2020

(87) PCT Pub. No.: WO2019/076301
PCT Pub. Date: Apr. 25, 2019

(65) Prior Publication Data
US 2021/0195467 A1    Jun. 24, 2021

(30) Foreign Application Priority Data

Oct. 16, 2017 (CN) .......................... 201710958490.X

(51) Int. Cl.
*H04W 40/00* (2009.01)
*H04W 28/24* (2009.01)
*H04W 8/26* (2009.01)

(52) U.S. Cl.
CPC ............. *H04W 28/24* (2013.01); *H04W 8/26* (2013.01)

(58) Field of Classification Search
CPC ................................ H04W 28/24; H04W 8/26
(Continued)

(56) References Cited

U.S. PATENT DOCUMENTS 6,470,022 B1 * 10/2002 Rochberger ........ H04L 12/5601
370/395.2
6,473,408 B1 * 10/2002 Rochberger ............ H04L 45/10
370/255

(Continued)

OTHER PUBLICATIONS

European Patent Office, The extended European search report dated Jun. 28, 2021 for application No. EP18868091.2.
(Continued)

*Primary Examiner* — Mark G. Pannell
(74) *Attorney, Agent, or Firm* — Li & Cai Intellectual Property (USA) Office

(57) ABSTRACT

The present disclosure provides an integration method for multiple centralized units, an integration device for multiple centralized units, and an integration system for multiple centralized units. The integration system for multiple centralized units includes a centralized unit center, the centralized unit center is configured to integrate multiple logical centralized units, the multiple logical centralized units share one or more function modules at corresponding levels according to a preset service requirement, and the function modules at the corresponding levels are configured to provide function services at the corresponding levels for the logical centralized units.

11 Claims, 5 Drawing Sheets

(58) Field of Classification Search
USPC .......................................................... 455/445
See application file for complete search history.

(56) References Cited

U.S. PATENT DOCUMENTS

| | | | | |
|---|---|---|---|---|
| 7,495,608 | B1* | 2/2009 | Chen ..................... | G01S 19/06 342/357.43 |
| 2001/0018346 | A1* | 8/2001 | Okajima ................ | H04B 7/026 455/437 |
| 2001/0043572 | A1* | 11/2001 | Bilgic .................. | H04B 7/2615 370/281 |
| 2002/0009070 | A1* | 1/2002 | Lindsay ............ | H04W 36/0069 370/347 |
| 2002/0178116 | A1* | 11/2002 | Yamasaki ........ | H04N 21/25866 705/39 |
| 2003/0013439 | A1* | 1/2003 | Daniel ................ | H04L 12/1859 455/422.1 |
| 2003/0074422 | A1* | 4/2003 | Montemurro ........... | H04L 67/18 709/219 |
| 2004/0141617 | A1* | 7/2004 | Volpano ................ | H04L 63/105 380/270 |
| 2004/0156068 | A1* | 8/2004 | Yoshida ................ | G06F 21/608 358/1.13 |
| 2004/0196812 | A1* | 10/2004 | Barber .................. | H04W 88/08 370/334 |
| 2005/0018686 | A1* | 1/2005 | Igarashi .............. | H04W 12/068 370/395.2 |
| 2005/0288033 | A1* | 12/2005 | McNew .................. | G01S 5/021 455/456.1 |
| 2006/0078123 | A1* | 4/2006 | Bichot .................. | H04W 48/20 380/270 |
| 2006/0094400 | A1* | 5/2006 | Beachem .............. | H04M 7/121 455/410 |
| 2006/0165103 | A1* | 7/2006 | Trudeau .............. | H04L 12/2854 370/401 |
| 2006/0223527 | A1* | 10/2006 | Lee ....................... | H04W 48/16 455/432.2 |
| 2007/0077929 | A1* | 4/2007 | Chen .................... | H04W 16/06 455/445 |
| 2007/0202871 | A1* | 8/2007 | Altshuller ............. | H04W 68/06 455/428 |
| 2008/0071444 | A1* | 3/2008 | Hillman ........... | G08B 13/19647 701/36 |
| 2008/0108365 | A1* | 5/2008 | Buddhikot .......... | H04W 72/048 455/452.1 |
| 2008/0144591 | A1* | 6/2008 | Jokela .................. | H04W 48/12 370/338 |
| 2008/0186933 | A1* | 8/2008 | Willman ............... | H04W 88/02 370/338 |
| 2009/0141702 | A1* | 6/2009 | Kuo ........................ | H04L 47/41 370/351 |
| 2009/0170472 | A1* | 7/2009 | Chapin ............... | H04W 12/086 455/410 |
| 2010/0278141 | A1* | 11/2010 | Choi-Grogan .... | H04W 36/0085 370/331 |
| 2011/0013608 | A1* | 1/2011 | Lee ....................... | H04W 72/04 370/338 |
| 2011/0103229 | A1* | 5/2011 | Fidler ................... | H04W 24/08 370/241 |
| 2011/0116433 | A1* | 5/2011 | Dorenbosch ........ | H04W 72/005 370/312 |
| 2011/0141895 | A1* | 6/2011 | Zhang ..................... | H04L 12/66 370/235 |
| 2012/0002537 | A1* | 1/2012 | Bao ........................ | H04W 24/04 370/221 |
| 2012/0096096 | A1 | 4/2012 | Jang | |
| 2013/0136097 | A1* | 5/2013 | Yu ....................... | H04W 72/121 370/330 |
| 2013/0159458 | A1* | 6/2013 | Yu ........................... | H04L 67/10 709/217 |
| 2013/0294403 | A1* | 11/2013 | Srinivasan ........... | H04W 88/12 370/331 |
| 2014/0198715 | A1* | 7/2014 | Zasowski ........... | H04B 7/15507 370/315 |
| 2014/0247792 | A1 | 9/2014 | Wang | |
| 2014/0301286 | A1* | 10/2014 | Abe ...................... | H04L 1/0027 370/329 |
| 2015/0023278 | A1* | 1/2015 | Boccardi ............... | H04L 5/0048 370/329 |
| 2015/0063300 | A1* | 3/2015 | Wenger ................. | H04W 36/08 370/331 |
| 2015/0065146 | A1* | 3/2015 | Wenger ................. | H04W 36/32 455/440 |
| 2015/0110008 | A1* | 4/2015 | Puthenpura ........... | H04W 16/18 370/329 |
| 2016/0055239 | A1* | 2/2016 | Morse ................... | G06F 16/686 715/716 |
| 2018/0124688 | A1* | 5/2018 | Thubert ..................... | H04L 1/18 |
| 2018/0288614 | A1* | 10/2018 | Zaks ....................... | H04L 63/06 |
| 2018/0368109 | A1* | 12/2018 | Kim ................ | H04W 72/0433 |
| 2019/0141572 | A1* | 5/2019 | Zaks ....................... | H04L 9/3242 |

OTHER PUBLICATIONS

Intel Corporation:"Realization of Network Functions", 3GPP TSG-RAN3 Meeting #93, Aug. 21, 2016.

* cited by examiner

# INTEGRATION METHOD, DEVICE AND SYSTEM FOR MULTIPLE CENTRALIZED UNITS

CROSS-REFERENCE TO RELATED APPLICATIONS

The present application claims the priority of Chinese Patent Application No. 201710958490.X, entitled "INTEGRATION METHOD, DEVICE AND SYSTEM FOR MULTIPLE CENTRALIZED UNITS", filed on Oct. 16, 2017, the contents of which are incorporated herein in their entirety by reference.

TECHNICAL FIELD

The present disclosure relates to the field of communications, and in particular, to an integration method for multiple centralized units, an integration device for multiple centralized units, and an integration system for multiple centralized units.

BACKGROUND

In related art, architectures of a base station system include a centralized radio access network (C-RAN) architecture and a distributed radio access network (D-RAN) architecture. Currently, the C-RAN architecture still has a problem in transmission of radio remote coverage, and a requirement of high throughput cannot be met.

In 5th-Generation mobile communication technology, an improved C-RAN architecture is adopted, that is, a vertical architecture in which a centralized unit (CU) and a distributed unit (DU) are separated is proposed for a single base station (i.e., gNode B, gNB for short), a single logical base station is divided into two parts, i.e., the CU and the DU, each logical base station has only one CU, but there may be multiple DUs, and the gNB-CU and the gNB-DU, which are separated from each other according to a protocol, communicate through an F1 interface.

Transmission bottleneck of the CU and the DU may be further alleviated by a centralized deployment of multiple CUs inheriting C-RAN, but problems of resource waste, high overhead, poor real-time performance and the like exist.

SUMMARY

An embodiment of the present disclosure provides an integration system for multiple centralized units (CUs), including a CU center configured to integrate multiple logical CUs, where the multiple logical CUs share one or more function modules at corresponding levels according to a preset service requirement, and the one or more function modules at the corresponding levels provide function services at the corresponding levels for the respective CUs.

An embodiment of the present disclosure further provides an integration method for multiple centralized units (CUs), including: configuring multiple logical CUs selected in advance to share one or more function modules at corresponding levels according to a preset service requirement; and providing, by the one or more function modules at the corresponding levels, function services at the corresponding levels for the respective logical CUs.

An embodiment of the present disclosure further provides an integration device for multiple centralized units (CUs), including a memory and a processor, where the memory stores an integration program for multiple CUs, and the processor executes the program to implement the integration method of the embodiments of the present disclosure.

An embodiment of the present disclosure further provides a computer-readable storage medium storing an integration program for multiple CUs which, when read and executed by a computer, cause the computer to implement the integration method of the embodiments of the present disclosure.

DETAILED DESCRIPTION

The present disclosure provides an integration method for multiple centralized units (CUs), an integration device for multiple centralized units (CUs), and an integration system for multiple centralized units (CUs), which are described in further detail below with reference to accompanying drawings and embodiments. It should be understood that the specific embodiments described herein are merely illustrative of the present disclosure and do not limit the present disclosure.

An embodiment of the present disclosure provides an integration system for multiple centralized units (CUs). The system includes a CU center configured to integrate multiple logical CUs sharing one or more function modules at corresponding levels according to a preset service requirement, and the one or more function modules at the corresponding levels are configured to provide function services at the corresponding levels to the respective logical CUs.

In the embodiment of the present disclosure, functions of multiple CUs to be deployed are integrated in a centralized manner, resource constraint between the CUs is broken, resource multiplexing between the CUs is realized, and the problem of resource waste caused by the centralized deployment of the multiple CUs under the CU-DU separation architecture is effectively solved.

In some implementations, the CU center includes a selection module and the one or more function modules at the corresponding levels. The selection module is configured to select the multiple logical CUs, and configure the multiple CUs to share the one or more function modules at the corresponding levels in the CU center according to the preset service requirement. The function modules at the corresponding levels are configured to provide function services at the corresponding levels for the respective logical CUs.

In some implementations, the function modules at the corresponding levels include a base station level module configured to provide function services at a base station level, a cell level module configured to provide function services at a cell level, and a user level module configured to provide function services at a user level.

Figure 1:
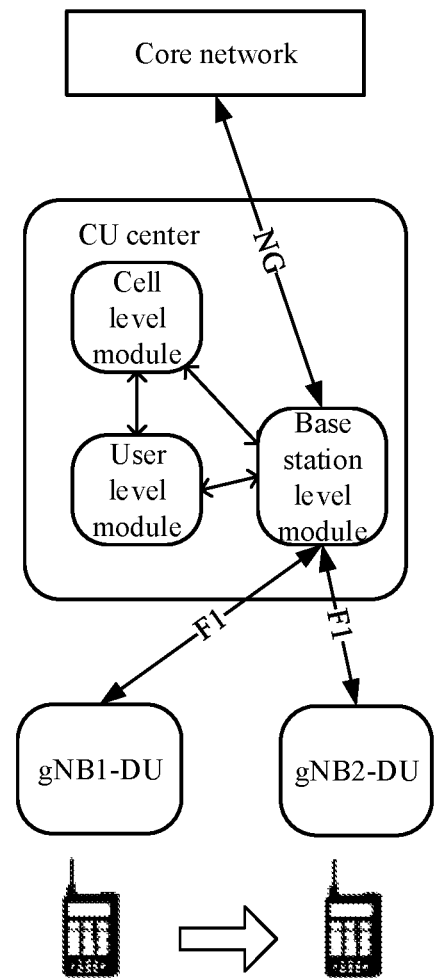
FIG. 1 is a schematic structural diagram of a CU center according to an embodiment of the present disclosure.

FIG. 1 shows a schematic structural diagram of a CU center according to an embodiment of the present disclosure. As shown in FIG. 1, the CU center according to an embodiment of the present disclosure integrates CUs of multiple logical base stations, presents an independent CU set externally, has an unchanged interface, and internally integrates the CUs at the base station level, the cell level, and the user level according to difference in service requirements, and an application range of a service module (or referred to as function module) is no longer limited to single CU, but is globally shared. The function module at each level is described in detail below.

The base station level module provides function services at CU level, such as management of transmission links between a CU and external network element interfaces (F1, NG).

Figure 2:
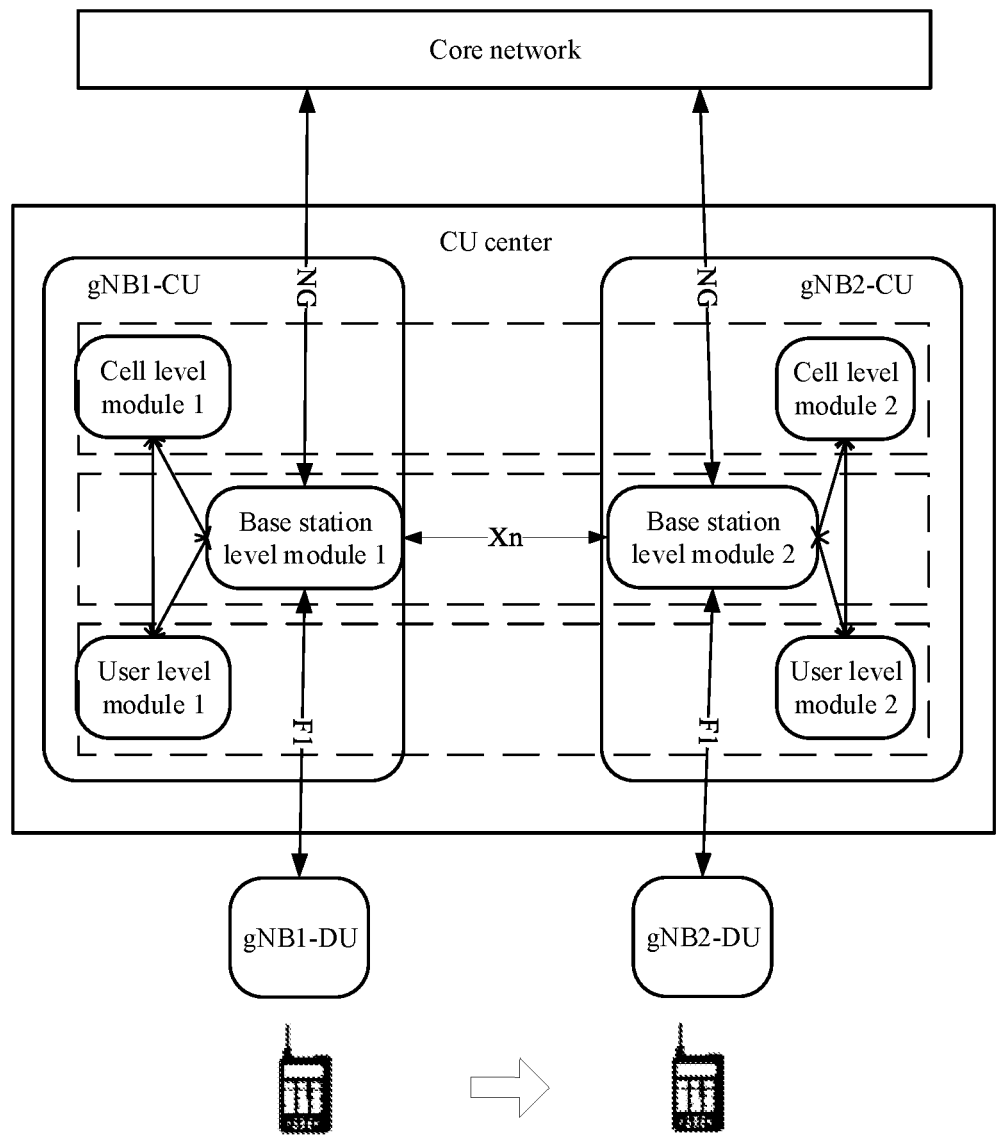
FIG. 2 is a schematic diagram of an integration process of function modules at each level of multiple CUs according to an embodiment of the present disclosure.

FIG. 2 shows a schematic diagram of an integration process of function modules at each level of multiple CUs according to an embodiment of the present disclosure. As shown in FIG. 2, before the function modules at each level of the CUs are integrated, the function modules at the base station level of the CUs are independent each other, a transmission link can only be used in a corresponding CU, and when a UE moves across the CUs, transmission links in different CUs need to be switched.

As shown in FIG. 1, after the function modules at each level of the CUs are integrated, the base station level module is shared in the CU center, and in charge of managing all external transmission links of the logical CUs, each transmission link is identified uniquely by a base station identifier (gNB ID) and a link identifier (link ID). That is, the base station level module is configured to identify the transmission link of each logical CU by a preset base station identifier and a preset link identifier.

In an embodiment of the present disclosure, under a condition that an external network element is not changed, the UE can be handed over across the logical CUs without switching between transmission links. That is to say, when the UE is handed over across the logical CUs, the transmission link between the UE and the core network remains unchanged (the service between the UE and the core network can be maintained when the UE uses any transmission link of NG interface in the CU center), and no switching needs to be performed between transmission links of NG interfaces, so that the core network would not sense handover of the UE across the logical CUs.

The cell level module provides function services at the cell level in the CU, including cell air interface resource admission, cell information query and the like.

As shown in FIG. 2, before the function modules at each level of the CUs are integrated, the cells in the CUs are managed independently, the cells are invisible across the CUs, and services at the cell level can be completed only in each CU. In the cells of different CUs, the UE corresponds to different processes of cell level modules.

As shown in FIG. 1, after the function modules at each level of the CUs are integrated, the cell level module is shared in the CU center, a management range of the cell level module is expanded to multiple logical CUs, and different cells need to be uniquely determined by using two identifiers including the base station identifier (gNB ID) and the cell identifier (Cell ID). That is, the cell level module is configured to identify each cell by a preset base station identifier and a preset cell identifier.

In an embodiment of the present disclosure, when the UE moves across the CUs, a service of a source cell and a service of a target cell can be processed in the cell level module in a centralized manner, so that a cooperation among base stations is effectively reduced.

The user level module provides function services at the UE level in the CU, including control of service flows such as accessing, switching, releasing of UE and the like.

As shown in FIG. 2, before the function modules at each level of the multiple CUs are integrated, a function processing at the UE level can only be performed in each CU, and a service of the UE across CUs needs to use services at the UE level in two or more CUs and is completed through cooperation. During a movement of the UE across the CUs, user level resources need to be created, released or migrated within different CUs.

As shown in FIG. 1, after the function modules at each level of the CUs are integrated, the user level module is shared in the CU center to provide services at UE level across logical CUs, identities of UEs in the CU center are unified, service flows of all UEs are processed in a centralized manner, and user level resources do not need to be created, released or migrated repeatedly in the CUs.

The above function modules at the respective levels can provide global services in the CU center, the user level module is a core module for processing a UE service flow, the base station level module provides a transmission link service for the UE level module, for example, a forwarding function of a UE dedicated signaling, and the cell level module provides a service such as cell admission, so that the UE service flow in the CU center is simplified after integrating the function modules of each level of the CUs.

Figure 3:
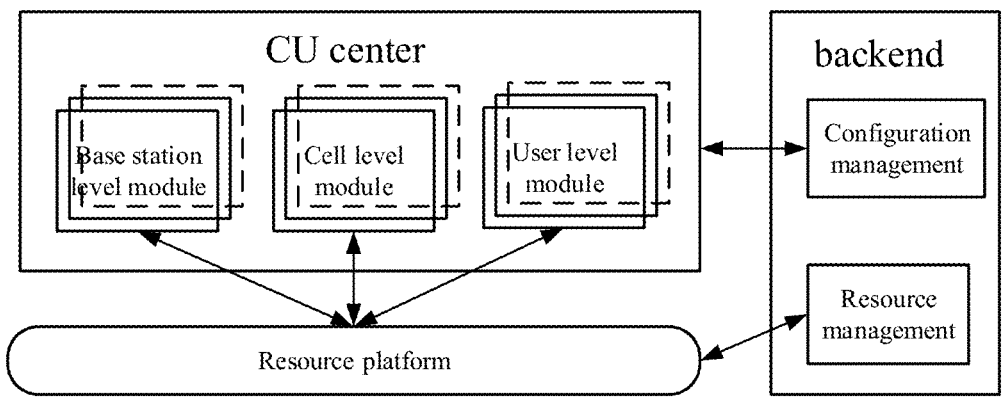
FIG. 3 is an overall architecture diagram of an integration system for multiple CUs according to an embodiment of the present disclosure.

In some implementations, as shown in FIG. 3, the integration system for multiple CUs may further include one or more of a configuration management module, a resource platform module, and a resource management module.

The configuration management module (abbreviated as configuration management) is configured to configure the CU center at a backend, for example, the CU center, as an independent network function (NF), is configured with a network function identifier (NF ID). One or more logical CUs and corresponding parameters of the logical CUs are configured under the NF. The parameters may be divided into CU global level parameters, base station level parameters, cell level parameters and user level parameters. The CU global level parameters correspond to common parameters for all CUs in the CU center. The base station level parameters correspond to common parameters of all cells in each CU, and the cell level parameters correspond to specific parameters of each cell. The user level parameters correspond to specific parameters of users. The backend synchronizes configuration parameters with the modules in the CU center through a management surface.

The resource platform module (abbreviated as resource platform), as a general platform system for supporting the CU center, provides an operating environment and system resources for the modules of the CU center, supports dynamic resource adjustments, and executes a control command and a strategy issued by the resource management at the backend.

The resource management module (abbreviated as resource management) is configured to provide a resource arranging function at the backend, and is responsible for defining a specification of system resources, setting a resource adjustment strategy and the like, and managing the system resources of the modules in the CU center through the resource platform. For example, the resource management module allocates initial system resources to the modules in the CU center, and sets a resource adjustment strategy and a resource adjustment granularity, where the resource adjustment strategy includes a resource adjustment strategy based on system resource indicators such as a CPU utilization rate and a resource adjustment strategy based on a key performance indicator (KPI) registered by the service module, and both the resource adjustment strategies require to configure a resource expansion and a recovery threshold at the backend. Upon an index reaches the threshold, the resource platform adjusts the resources of the modules in the CU center according to a preset resource adjustment granularity. That is to say, the resource management module is configured to allocate corresponding resources to the function modules at the corresponding levels in the CU center based on the function module granularity, and for the function module at each level, the allocated corresponding resources may be adjusted according to a preset resource adjustment strategy and based on a change of service requirement corresponding to the function module.

The relationship of the modules in the CU center is as follows: when the CU center is initially established, the configuration management at the backend is responsible for configuring parameters of the CU center and parameters of the modules in the CU center, and meanwhile, the resource management at the backend is responsible for allocating system resources for the modules in the CU center and informs the resource platform to execute corresponding system resource allocation; then, the modules in the CU center are loaded onto the resource platform, a configuration at the backend is synchronized and the creation of the CU center is finished; during operation processes of the modules in the CU center, the system resources of the modules may be dynamically adjusted according to the resource adjustment strategy set by the resource management by interacting with the resource platform.

In summary, according to the embodiment of the present disclosure, resources of the CU center are allocated by the resource management at the backend through the resource platform, the resources are allocated based on the service module granularity (instead of a CU granularity), and an amount of resources to be allocated is set according to service requirements of the modules. For example, the resources for the base station level module may be allocated by referring to maximum number of transmission links to be supported, the resources for the cell level module may be allocated by referring to maximum number of cells to be supported, and the resources for the user level module may be allocated by referring to maximum number of users to be supported. Services requirements at different levels are allocated with resources at different levels, which correspond to allocation units (resource specifications, such as one core of CPU+1G memory) of the resource platform.

The modules in the CU center may adopt a design of multiple instances sharing responsibility for load, functions of the instances are the same, and the services provided by the modules may be distributed to different instances to be processed simultaneously. Each instance corresponds to a resource allocation unit configured by the resource platform, and when the resources are initially allocated, the resource platform allocates resources to the modules according to the service requirements to create a certain number of instances. The resources for the modules may be dynamically adjusted during operations of the modules.

The resource adjustment may be completed by an interaction between the service module and the resource platform, and the mode of triggering the dynamic resource adjustment includes monitoring by the resource platform and feedback by the service module. The resource platform may monitor a utilization rate of the system resources (such as CPU), and the resource adjustment may be triggered when the utilization rate reaches a configured threshold value. The service module may register and feedback a KPI (such as throughput) to the resource platform, for example, when the number of activated users reaches a threshold, the resource adjustment is triggered.

The resource adjustment granularity may be refined to an instance of the function modules, when the system resources are limited (or KPI is deteriorated), the number of instances may be increased to expand the resources, otherwise, when many service resources are idle (or KPI is improved), the number of instances is decreased to recycle the resources. Service functions of all the modules in the CU center are independent, and resource adjustments for all the modules are not influenced mutually and not restricted by the logical CU/base station.

Therefore, according to the embodiment of the present disclosure, the integration system for multiple CUs integrates the functions of the multiple CUs to be deployed in a centralized manner, breaks resource constraint between the CUs, realizes resource multiplexing between the CUs, and effectively solves the problem of resource waste existing in the centralized deployment of multiple CUs under the CU-DU separation architecture, for example, under an extreme condition, a processing capacity for each type of services in a single logical CU is equal to a sum of processing capacities of all the CUs in the entire CU center, thereby expanding a range of resource sharing.

In the embodiment of the present disclosure, in the CU center, allocation and adjustment of resources at CU level are refined to allocation and adjustment of resources at function module level, the adjustment granularity is refined, and the resources may be classified according to the service requirements of the modules, so that the allocation and adjustment of the resources are more flexible and accurate, and the utilization rate of the resources is improved.

In the embodiment of the present disclosure, after services are integrated in the CU center, not only a service flow overhead due to the user moving across the base stations is reduced, but also unnecessary resource migration and switching are reduced, and a service function of cooperation between the base stations is simplified, which is easier to be implemented and is beneficial to performance improvement.

Specific implementation examples of the integration system for multiple CUs according to an embodiment of the present disclosure is described below.

Example 1

This example describes the process of creating a CU center from a number of selected CUs.

Figure 7:
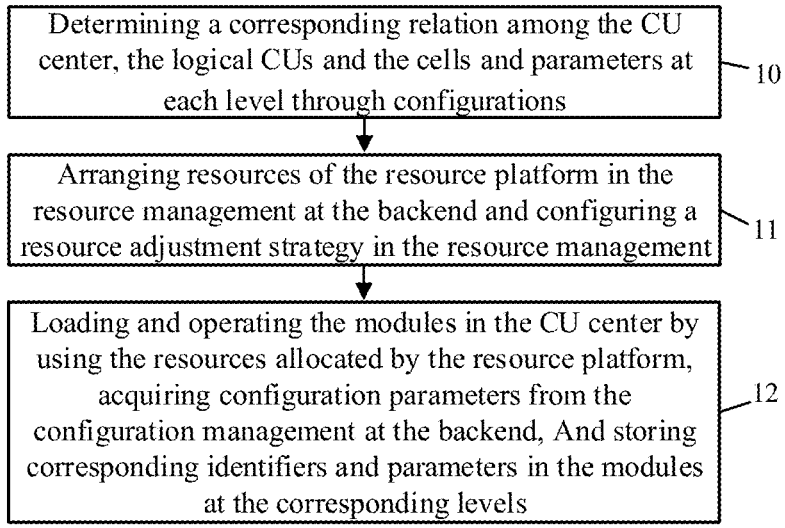
FIG. 7 is a flow chart of steps of creating a CU center according to an embodiment of the present disclosure.

The CU center initially created includes gNB1-CU and gNB2-CU, corresponding to gNB1-DU and gNB2-DU, respectively, and each DU corresponds to a cell. Specific steps of creating the CU center include following steps 10 to 12, as shown in FIG. 7.

In step 10, in the configuration management at the backend (see FIG. 3), the CU center is configured as a primary root node of a network function (NF), an NF ID of the CU center is set, and global level parameters are configured, such as function switches which are the same for the gNB1 and the gNB2; then, gNB1-CU and gNB2-CU are added in a CU base station pool, corresponding gNB IDs are configured respectively, and base station level parameters are configured, such as parameters shared by all cells under each CU, including transmission link information between gNB1, gNB2 and an external network element; then, respective cells under gNB1-CU and gNB2-CU are added respectively, and corresponding Cell IDs and cell level parameters are configured, for example, a cell1 for gNB1 and a cell1 for gNB2 are configured; in a parameter configuration process, a UE level configuration is distributed at global level, base station level, or cell level according to a usage scenario configuration.

A corresponding relation among the CU center, the logical CUs and the cells and parameters at each level can be determined through configurations as above.

In step 11, resources of the resource platform are arranged in the resource management at the backend (see FIG. 3). When the resources are allocated to the modules through the resource platform, the CU center is taken into consideration as a whole, the logical CUs are not distinguished. Since service modules of the gNB1-CU and the gNB2-CU are shared, in an extreme case, the service capacity of a single gNB-CU is equal to a sum of the service capacities of all the CUs (gNB1-CU and gNB2-CU) in the CU center. The base station level module needs to support a sum of all transmission links (e.g. two transmission links) under the gNB1-CU and the gNB2-CU, the cell level module needs to support a sum of all the cells (e.g. two cells) under the gNB1-CU and the gNB2-CU, and the user level module needs to support a maximum number of users (which may be estimated according to a service model) in a coverage area corresponding to all the logical CUs. Initially, instance resources to be allocated are determined according to a maximum capacity supported by each instance of the modules, for example, at most ten thousands of users in the coverage area are estimated, and assuming that six thousands of users are supported by a single instance of the user level module, two instances need to be allocated as initial resources. Meanwhile, a resource adjustment strategy is configured in the resource management, which is described later. After finishing resource arrangement by the resource management, the resource arrangement is issued to the resource platform, and the resource platform allocates the resources for the modules in the CU center.

In step 12: the modules in the CU center are loaded and operated by using the resources allocated by the resource platform, meanwhile configuration parameters are acquired from the configuration management at the backend, corresponding identifiers and parameters in the modules are stored at the corresponding levels, such as the user level module, two instances are initially loaded, and the UE flow is processed by adopting a strategy of multiple instances sharing load.

After the modules are successfully loaded and operated and the configuration parameters are successfully acquired from the backend, the CU center is established.

An application scenario for this example is as follows: business district users and residential district users are covered by different base stations (such as gNB1-CU and gNB2-CU) respectively, the number of business district users is relative large in daytime, the number of residential district users is relative large in nighttime, and correspondingly, each of the gNB1-CU and the gNB2-CU have different amount of services during different time periods. Under a condition that total resources are limited, the resources of the CUs are independent in a traditional centralized deployment mode of multiple CUs, and thus the resources of each CU need to be dynamically adjusted. The CU center created by this example integrates the gNB1-CU and the gNB2-CU, resources are completely shared, and the resources of the CUs do not need to be dynamically adjusted.

Example 2

This example is used to illustrate a service flow of handover of a UE across the CUs, in order to elaborate a simplification of service collaboration between the CUs.

In this example, the configuration management module is configured to assign a UE global identifier to a user equipment when the user equipment accesses any CU in the CU center.

The base station level module is configured to maintain the transmission link between the UE and the core network unchanged through the UE global identifier, when the UE is handed over across the logical CUs in the CU center.

The UE global identifier is dynamically assigned when the UE accesses the logical CU in the CU center and is unique in the CU center.

In addition, the UE has pairs of internal identifier and external identifier (called UE level interface identifier) at interfaces of the logical CUs, the internal identifier of the UE level interface identifier is used when receiving a UE message and is assigned by the CU center, and the external identifier of the UE level interface identifier is used when transmitting the UE message and is assigned by an external network element.

Mapping relation exists among all identifiers of the UE, the global identifier of the UE in the CU center is unique, the internal identifier of the UE level interface identifier is unique in each CU, but multiple internal identifiers of the UE may exist in the CU center (e.g., in a mobility scene).

Figure 8:
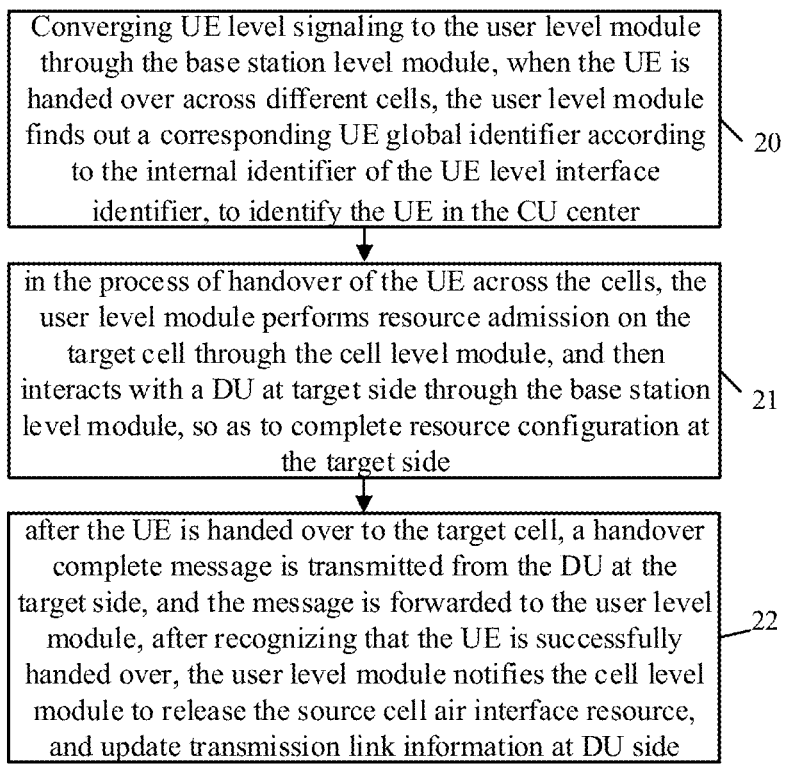
FIG. 8 is a flow chart of a service flow of a UE according to an embodiment of the present disclosure.

Referring to FIG. 1, during moving of a connected UE from the gNB1-DU to the gNB2-DU, a handover procedure is triggered. The user level module is used as a center for the service flow processing of the UE, and other modules provide cooperative services, for example, the cell level module is responsible for resource admission, and the base station level module is responsible for receiving and transmitting control plane signaling. For example, the service flow of the UE includes following steps 20 to 22, as shown in FIG. 8.

In step 20, UE level signaling, transmitted from external network elements (interfaces) corresponding to different logical CUs, is converged to the user level module through the base station level module to be processed, and the user level module is used as a centralized point for processing service flows of the user in the CU center. Being triggered by a measuring report, when the UE is handed over across different cells, the user level module finds out a corresponding UE global identifier according to the internal identifier of the UE level interface identifier, so as to identify the UE in the CU center.

In step 21, in the process of handover of the UE across the cells, a source cell and a target cell where the UE is located are both in the CU center, and the user level module performs resource admission on the target cell through the cell level module, and then interacts with a DU at target side through the base station level module, so as to complete resource configuration at the target side. During the process, the DU at source side and the DU at the target side use different transmission links (i.e., F1 interfaces) respectively, but the transmission links are all managed by the base station level module.

In step 22, after the UE is handed over to the target cell, a handover complete message is transmitted from the DU at the target side, and the message is forwarded to the user level module through the base station level module by using the internal identifier of the F1 interface at the target side. After recognizing that the UE is successfully handed over, the user level module notifies the cell level module to release the source cell air interface resource, and update transmission link information at DU side (from the source side to the target side, including an F1 interface identifier of the UE), where the transmission and identifier of the NG interface remain unchanged, the core network would not perceive the cell handover of the UE, and the handover process is ended.

In above steps, the user level module is responsible for centrally processing handover signaling of the UE across different CUs and maintaining the user identifier of the UE in the CU center and at the CU interface; the cell level module is responsible for processing admission of air interface resource at the target side and deletion of air interface resource at the source side; and the base station level module is responsible for switching the transmission link of the UE at the F1 interface and maintaining the transmission link of the NG interface unchanged. The modules involved in the whole handover process are shared by different logical CUs in the CU center, cooperation among different CUs is not needed, and the core network would not sense cell handover of the UE, so that the handover process is simplified.

In contrast, in the CU-DU separation architecture, when the UE is handed over across the CUs, service functions of the gNB-CUs at the source side and the target side are independent from each other, the whole handover process, including handover request and response, resource creation in handover preparation stage at the target side, and resource release at the source side after completion of the handover, needs to be completed by cooperation through Xn interface, and after the handover across the CUs, an interaction needs to be performed with the core network, so as to complete handover of the transmission link of the NG interface.

In the architecture in which the multiple centralized units are integrated according to the embodiment of the present disclosure, when the UE is handed over across the CUs, resources of the gNB-CUs at the source side and the target side are all integrated in the CU center, service flow processing is centralized in the user level module, and service resources of the source side and the target side are shared. New user resource do not need to be created, and message interaction of Xn interface between base stations is also not needed. In the handover process across the CUs, the transmission link of the original NG interface is shared, and switching of the transmission link of NG interface is not needed.

Figure 4:
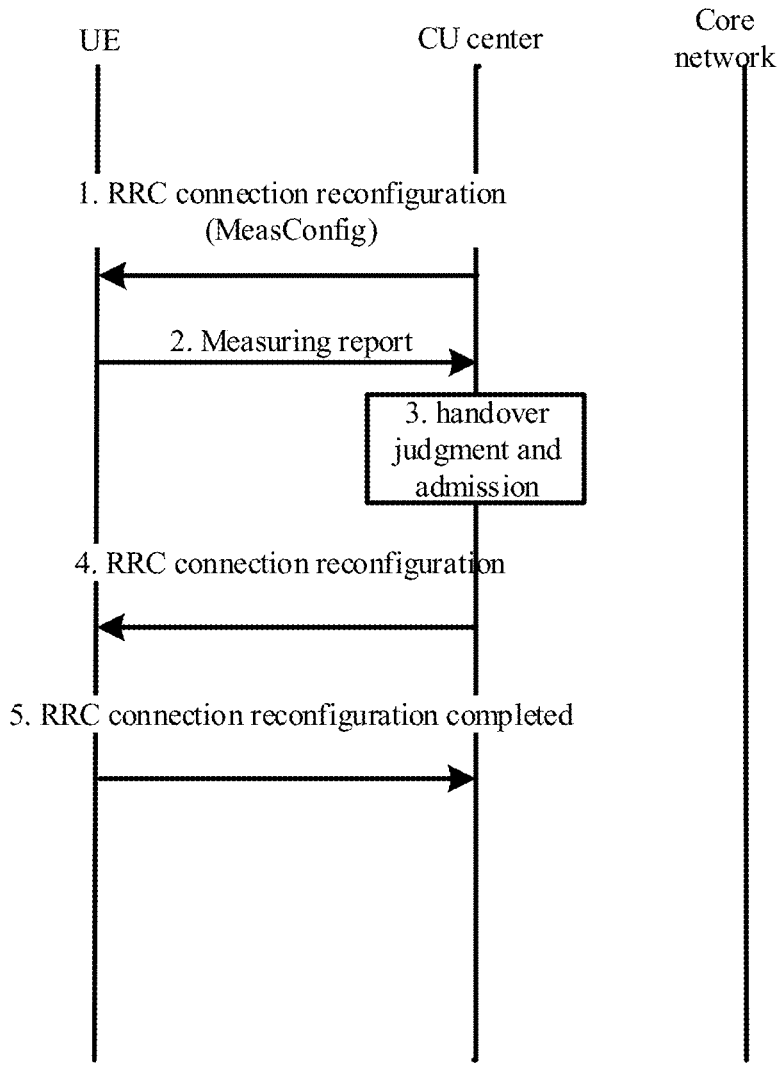
FIG. 4 is a flow chart showing a handover of a UE across different logical CUs according to an embodiment of the present disclosure.

FIG. 4 shows a flow chart of handover of a UE across different logical CUs according to an embodiment of the present disclosure.

Similarly, in a case that the UE in a connected state is continuously handed over among multiple gNB-CUs in the CU base station pool, cooperation between the base stations through an Xn interface is not needed, the transmission link of NG interface is not needed to be switched, and the core network cannot sense the handover of the UE across the logical CUs.

Example 3

This example is used to illustrate the method of adjusting resources within the CU center according to service requirements.

In the CU center (see FIG. 3), each module adopts a design of multiple instances sharing load, resources of each module may be expanded independently, and when the service requirement of a certain function module increases, the resources are expanded flexibly for the module, for example, the number of instances is increased. Conversely, when the service requirement of the module is reduced, the corresponding resources may be reduced, for example, the number of instances is reduced.

The application scenarios of this example include, for example, following application scenario 1 and application scenario 2.

Application scenario 1: in the resource management at the backend, a resource adjustment strategy of the user level module is set based on KPI (such as the number of online users), and threshold values for triggering resource adjustment are set, including an expansion threshold and a recovery threshold (for example, the number of users are ten thousand and one hundred, respectively).

When the number of online users in the CU center increases to a certain threshold (e.g., exceeds 10000), the user level module feeds back to the resource platform, and the resource platform performs resource elastic expansion on the user level module according to a preset resource adjustment strategy, for example, a new instance is added to share load. A service of a newly accessed UE may be processed by the new instance, and resources of other modules are not changed. When the number of online users decreases to a certain threshold (e.g., below 100), the resource platform also re-integrates the resources of the user level module according to feedback, for example, decreasing the number of instances to recovery free resources.

Application scenario 2: in the resource management at the backend, a resource adjustment strategy of the user level module is set based on utilization rate of system resources (e.g., utilization rate of CPU), and threshold thresholds for triggering resource adjustment are set, including an expansion threshold and a recovery threshold (e.g., the utilization rate of CPU is 80% and 10%, respectively).

When the number of concurrent users in the CU center increases and the utilization rate of CPU reaches a certain threshold (e.g., exceeds 80%), the resource platform may actively monitor and trigger resource dynamic adjustment, and perform resource elastic expansion on the user level module according to a preset resource adjustment strategy, for example, add a new instance to share load, and the resources of other modules are not changed. When the number of concurrent users is reduced and the utilization rate of CPU is reduced to a certain threshold (e.g., less than 10%), the resource platform re-integrates the resources of the user level module, for example, reduces the number of instances, to recovery the idle resources.

Figure 5:
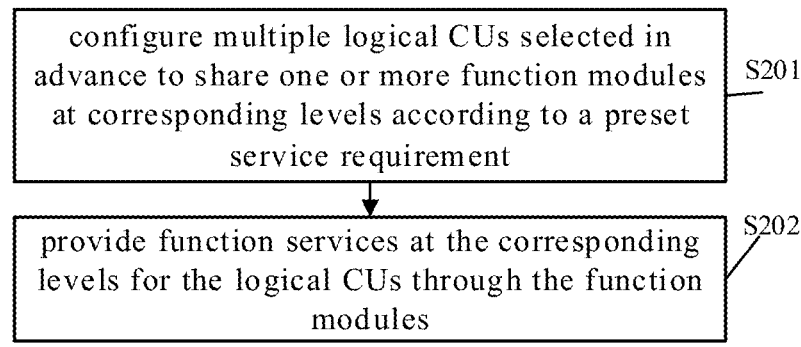
FIG. 5 is a flow chart of an integration method for multiple CUs according to an embodiment of the present disclosure.

An embodiment of the present disclosure provides an integration method for multiple CUs, as shown in FIG. 5, the method including: S201, configuring multiple logical CUs selected in advance to share one or more function modules at corresponding levels according to a preset service requirement; and S202, providing function services at the corresponding levels for the logical CUs through the function modules.

In some implementations, configuring multiple CUs selected in advance to share one or more function modules at the corresponding levels according to the preset service requirement includes: creating a CU center integrating the multiple logical CUs selected in advance; and configuring the multiple logical CUs to share one or more function modules at the corresponding levels in the CU center according to the preset service requirement.

In some implementations, the integration method for multiple CUs further includes: when a user equipment accesses any logical CU among the multiple logical CUs, assigning a UE global identifier to the user equipment; and when the UE is handed over across the CUs, maintaining the transmission link between the UE and a core network unchanged through the UE global identifier.

In some implementations, the integration method for multiple CUs further includes: identifying transmission links of the logical CUs through a preset base station identifier and a preset link identifier; and identifying the cells of the logical CUs through the preset base station identifier and a preset cell identifier.

In some implementations, the integration method for multiple CUs further includes: allocating corresponding resources to the function modules at the corresponding levels based on the function module granularity.

In some implementations, the integration method for multiple CUs further includes: for the function module at each level, adjusting corresponding resources allocated to the function module according to a change of service requirement corresponding to the function module and a preset resource adjustment strategy.

In the embodiment, the function modules at the corresponding levels include a base station level module configured to provide base station level function services, a cell level module configured to provide cell level function services, and a user level module configured to provide user level function services.

The integration method for multiple CUs according to the embodiment of the present disclosure integrates the functions of the multiple CUs to be deployed in a centralized manner, breaks resource constraint between the CUs, realizes resource multiplexing between the CUs, solves the problem of resource waste existing in the centralized deployment of multiple CUs under the CU-DU separation architecture, for example, under an extreme condition, a processing capacity for each type of services in a single logical CU is equal to a sum of processing capacities of all the logical CUs in the whole CU center, thereby expanding a range of resource sharing.

In the embodiment of the present disclosure, in the CU center, allocation and adjustment of resources at CU level are refined to allocation and adjustment of resources at function module level, the adjustment granularity is refined, and the resources may be classified according to specific service requirements of the modules, so that the allocation and adjustment of the resources are more flexible and accurate, and the utilization rate of the resources is improved.

In the embodiment of the present disclosure, after services are integrated in the CU center, not only a service flow overhead due to the user moving across the base stations is reduced, but also unnecessary resource migration and switching are reduced, and a service function of cooperation between the base stations is simplified, which is easier to be implemented and is beneficial to performance improvement.

Figure 6:
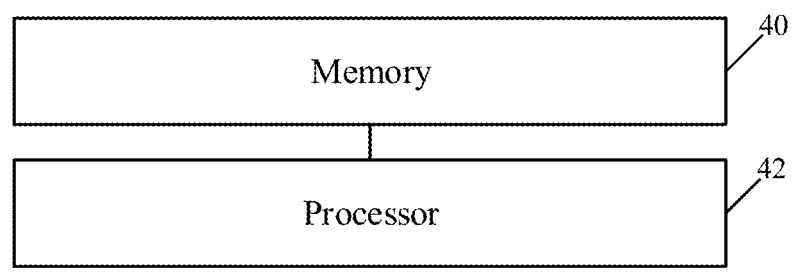
FIG. 6 is a schematic structural diagram of an integration device for multiple CUs according to an embodiment of the present disclosure.

An embodiment of the present disclosure further provides an integration device for multiple CUs, as shown in FIG. 6, the device includes a memory 40 and a processor 42, the memory 40 stores an integration program for multiple CUs, and the processor 42 executes the program to implement the integration method for multiple CUs according to the embodiment of the present disclosure.

An embodiment of the present disclosure further provides a computer-readable storage medium storing an integration program for multiple CUs which, when read and executed by a computer, cause the computer to implement the integration method for multiple CUs according to the embodiment of the present disclosure.

The computer-readable storage medium in the embodiment of the present disclosure may be RAM memory, flash memory, ROM memory, EPROM memory, EEPROM memory, register, a hard disk, a removable disk, a CD-ROM, or any other form of storage medium known in the art. The computer-readable storage medium may be coupled to a computer so that the computer may read information therefrom, and write information thereto, or the storage medium may be an integral part of the computer.

It should be noted that the integration method for multiple CUs according to the embodiment of the present disclosure may also be implemented by an application specific integrated circuit.

In addition, technical features related in the embodiments and the implementations of the present disclosure may be arbitrarily combined without being mutually exclusive.

Terms referring to ordinal numbers in the present disclosure (e.g., example 1, example 2, example 3, application scenario 1, application scenario 2, steps 10 to 12, steps 20 to 22, steps S201 to S202) are for convenience of description only, and do not have a specific meaning per se, i.e., do not indicate a specific order or priority.

The "module" and "unit" mentioned in the embodiments of the present disclosure may be implemented by software, hardware, or a combination thereof, and the hardware may be, for example, a processor, a computing device, an integrated circuit, and the like, which is not specifically limited by the present disclosure.

The above-described embodiments and implementations are intended to illustrate the technical solutions and advantages of the present disclosure in detail, and it should be understood that the above-described embodiments and implementations are only exemplary embodiments and implementations of the present disclosure and are not intended to limit the scope of the present disclosure, and any modifications, equivalents, variations, etc. made within the principle of the present disclosure should be considered as falling within the scope of the present disclosure.

What is claimed is:

1. An integration method for multiple centralized units, comprising:

configuring multiple logical centralized units selected in advance to share one or more function modules at corresponding levels according to a preset service requirement;

providing function services at the corresponding levels for the logical centralized units through the function modules at the corresponding levels;

in response to a user equipment accessing any one of the logical centralized units, assigning a user equipment global identifier to the user equipment; and in response to the user equipment being handed over across the logical centralized units, maintaining a transmission link between the user equipment and a core network unchanged through the user equipment global identifier.

2. The integration method of claim 1, wherein configuring the multiple logical centralized units selected in advance to share the one or more function modules at the corresponding level according to the preset service requirement comprises:
creating a centralized unit center integrating the multiple logical centralized units selected in advance; and
configuring the multiple logical centralized units to share the one or more function modules at the corresponding levels in the centralized unit center according to the preset service requirement.

3. The integration method of claim 1, further comprising:
identifying a transmission link of the logical centralized units through a preset base station identifier and a preset link identifier; and
identifying a cell of the logical centralized units through the preset base station identifier and a preset cell identifier.

4. The integration method of claim 1, further comprising:
allocating corresponding resources to the function modules at the corresponding levels based on a function module granularity.

5. The integration method of claim 4, further comprising:
for each function module at the corresponding level, adjusting the corresponding resources allocated to the function module at the corresponding level according to a preset resource adjustment strategy based on a change of service requirement corresponding to the function module.

6. An integration device for multiple centralized units, comprising a memory storing an integration program for multiple centralized units and a processor executing the program to implement the integration method of claim 1.

7. A non-transitory computer-readable storage medium storing an integration program for multiple centralized units which, when read and executed by a computer, cause the computer to implement the integration method of claim 1.

8. The integration method of claim 1, wherein the function modules at the corresponding levels comprise a base station level module configured to provide base station level function services, a cell level module configured to provide cell level function services, and a user level module configured to provide user level function services, and the integration method further comprises:

managing, by the base station level module, external transport links of all the logical centralized units;
managing, by the cell level module, cell resources of all the logical centralized units; and
managing, by the user level module, user identities of user equipment in the centralized unit center and in the logical centralized units.

9. The integration method of claim 1, further comprising:
configuring the centralized unit center, comprising configuring a centralized unit global level parameter, a base station level parameter, a cell level parameter and a user level parameter, wherein the centralized unit global level parameter corresponds to a common parameter of all the centralized units in the centralized unit center, the base station level parameter corresponds to a common parameter of all cells in each centralized unit, the cell level parameter corresponds to a specific parameter of each cell, and the user level parameter corresponds to a specific parameter of a user.

10. The integration method of claim 1, wherein each function module at the corresponding level is designed to have multiple instances, functions of the multiple instances are the same with each other, and a service provided by each function module at the corresponding level is processed by the multiple instances simultaneously, and the integration method further comprises:
allocating corresponding resources to the function modules at the corresponding levels based on a function module granularity.

11. The integration method of claim 10, further comprising:
adjusting, for each function module at the corresponding level, the corresponding resources allocated to the function module by increasing or decreasing the number of instances of the function module at the corresponding level according to a preset resource adjustment strategy based on a change of service requirement corresponding to the function module.

* * * * *